Aug. 1, 1961  W. B. HUCKABAY  2,994,397
METHOD AND SYSTEM FOR CONTINUOUS SEISMIC SURVEYING
Filed July 30, 1956  4 Sheets-Sheet 1

United States Patent Office 2,994,397
Patented Aug. 1, 1961

2,994,397
METHOD AND SYSTEM FOR CONTINUOUS SEISMIC SURVEYING
William B. Huckabay, Dallas, Tex., assignor, by mesne assignments, to Socony Mobil Oil Company, Inc., New York, N.Y., a corporation of New York
Filed July 30, 1956, Ser. No. 600,804
12 Claims. (Cl. 181—0.5)

This invention relates to seismic surveying and particularly to the use of sources of acoustic energy which make possible the attainment of a continuous seismic survey not heretofore practical.

It has been customary in seismic surveying to utilize a charge of dynamite or the like as a source of acoustic energy of needed amplitude and character. The disadvantages as well as desirable features of an explosive source of acoustic energy are well understood by those skilled in the art.

It has been an objective to generate acoustic pulses which are reproducible in character and which have the requisite amount of energy and of desired frequency. There have been proposed many methods to achieve these objectives including massive weights dropped onto the earth, closed containers filled with gas and ignited to produce an explosion thereof but explosives such as dynamite have continued to be the conventional source of seismic energy.

In accordance with the present invention, pulsed acoustic energy of desired magnitude and frequency can be developed singly or at any desired repetition rate. The importance of the new source of acoustic energy and the manner in which it is used in the present invention will be fully appreciated from a consideration of seismic reflection surveying conducted over bodies of water. In operations involving a fathometer, high frequency acoustic pulses produced at controlled intervals make possible continuous measurements of water depth. In accordance with the present invention, continuous seismic surveying of formations below the floor of a water-covered area becomes a reality and the surveying may be conducted in continuous fashion with generation of a series of pulses of acoustic energy, each pulse being generated following the arrival of reflections of the preceding pulse at a seismic detector. More particularly, a new source of acoustic energy is provided which likewise makes possible different kinds of seismic surveying over the earth's surface and lends itself to continuous seismic surveying on land or water-covered areas.

Further, in accordance with the present invention, there is provided a system for seismically exploring a water-covered area which comprises structure forming an elongated combustion chamber having an open end extending to a point below the surface of the water. Means are provided for repeatedly loading said chamber with a combustible gas mixture. A carrier supports said structure including said chamber for movement of the point of entry thereof into the water along a predetermined course. Means including an igniter in the upper portion of said chamber communicates with said chamber. Means is provided for periodically exciting said igniter for initiating in the upper portion of said chamber of said structure a downward traveling wave of increasing speed in said mixture upon combustion of each of said mixtures whereby a downward traveling wave strikes the surface of the water at spaced points along said course. A detecting system is moved with said carrier and is responsive to seismic waves produced by each impact of said downward traveling wave for generating signals representative of said seismic waves. Means is also provided for recording said signals successively in side-by-side location representative of the spacing between said points along said course for the production of a visual representation of subsurface beds.

In a more specific aspect, the present invention is directed to a reflection surveying system in which the source of acoustic energy comprises an elongated member which has a length relative to cross-sectional area such that the propagation rate of burning of a combustible mixture filling the elongated member is greater than the speed of sound. At the same time the elongated member has a cross-sectional area greater than that which tends to produce quenching of the flame. At one end of the elongated member an igniting means is provided which under timed control with reference to the reflection system ignites a combustible mixture in the elongated member. Upon ignition, the flame proceeds toward an open end of the tube and develops within the tube and in the region of the fast moving flame high gas pressure which, in the form of a fast moving "slug" of gas, attains a speed greater than sound as it proceeds toward the end of the tube. At the mouth of the tube the sudden impact of the compressed slug of gas converts the large amount of energy thereof into acoustic energy. As will be hereinafter explained, the frequency content or the period of predominant frequencies in the pulse of the generated acoustic pulses can be controlled within fairly wide limits as by changing the richness of the combustible mixture to control the detonation.

For a more detailed understanding of the invention, the various features which may be controlled to produce acoustic energy of desired character and for a description of new reflection surveying systems provided in accordance with the present invention, reference may now be had to the following description taken in conjunction with the accompanying drawings in which.

Figure 1:
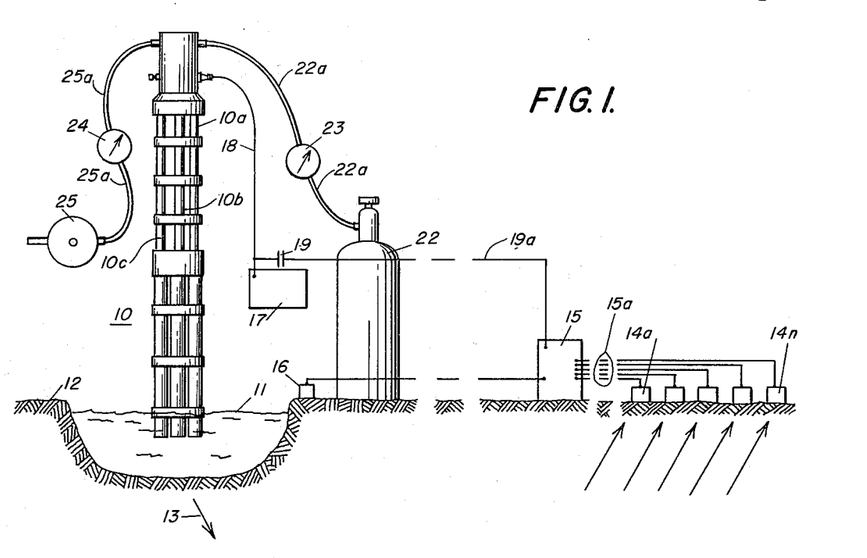
FIG. 1 is a diagrammatic representation of a seismic system positioned at the earth's surface.

In FIG. 1 an acoustic generator 10 embodying the invention has been illustrated as including a plurality of tubes, three of which, the tubes 10a, 10b, and 10c, are shown in the drawing and the ends of each of which are immersed into a body of water 11 at the earth's surface 12, the body of water or other substance forming a coupling medium between the acoustic generator 10 and the earth. As the generator 10 produces pulses of energy, in manner hereinafter to be explained, the predominant frequencies thereof may be controlled. After the seismic waves traveling along paths as indicated by the arrow 13 are reflected by subsurface beds, they actuate a plurality of detectors 14a—14n. The output signals from detectors 14a—14n are applied to a recorder 15 by way of lines 15a which produces a time-amplitude record thereof.

Time zero on the record from recorder 15, the instant of generation of the acoustic energy, is determined either by the initiation of operation of the generator 10 or from the response of a detector or geophone 16 located adjacent the generator 10. The acoustic generator 10 is under the control of a timing mechanism 17 which applies a firing pulse to the generator 10 by way of a conductor 18. This pulse is also applied by way of capacitor 19 and conductor 19a to the recorder 15 where the initiating pulse for the generator 10 may be utilized for determination of time-break or zero instant on the seismic record. The timing device 17 may cause repetitive operation of the generator 10 preferably at uniformly spaced time intervals as will hereinafter be explained.

In a preferred form of the invention, a combustible mixture is placed or injected in each of the several elongated members or tubes of the generator 10 by controlled flow of a combustible gas, such as propane, from a storage tank 22. The combustible gas flows through tubing 22a at a controlled rate of flow as by a flowmeter and other associated equipment indicated at 23. Such gas enters the upper portion of the generator 10 where it is mixed with air which enters therein at a rate controlled by a flow control mechanism 24. As indicated in FIG. 1, the air may likewise be supplied by way of tubing 25a under pressure from a cylinder 25 or from an air compressor with associated equipment.

Figure 2:
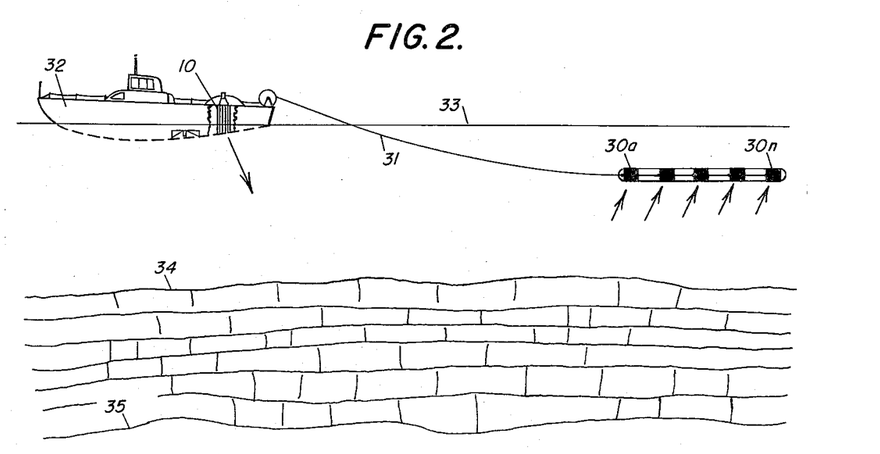
FIG. 2 illustrates the present invention in connection with marine exploration wherein a vessel is shown broken away to indicate a seismic source mounting.

While details of land surveying methods will later be discussed, reference to FIG. 2 is now to be made to show the application of the acoustic generator to seismic surveying over water-covered areas. A plurality of detectors 30a—30n suitably attached to a cable 31 including the conductors extend between the detectors and a recorder (not shown) mounted on boat 32. Boat 32 moves along a predetermined course, towing the detectors 30a—30n. The acoustic generator 10 carried by boat 32 is supported in coupling relation to the surface 33 of the body of water and is actuated in manner described in connection with FIG. 1. Preferably the seismic surveying is continuously conducted by repeated actuation of source 10 while boat 32 is under way. The records obtained, in accordance with the present invention, reveal the character of the subsurface reflecting beds.

In a fathometer the principal purpose is to obtain reflections from the bottom of the body of water 33 such as indicated at 34. It has been found that useful reflection data may also be obtained related to interfaces below the silt and other sediments which overlie the harder formations as in the region indicated at 35. Where the primary interest in the fathometer is the measurement of water-depth, the acoustic generator 10 will be controlled for the development of acoustic energy whose predominant frequency is much higher than 100 cycles per second and preferably the predominant frequency will be of the order of several thousand cycles per second. Such pulses will provide the desired distinctive reflections from the bottom 34.

Where the fathometer is to be utilized for reflections from below the layer 34, the generator 10 can be readily adjusted for production of acoustic pulses whose predominant frequencies will be much lower to permit greater penetration into sediments and production of reflections of adequate amplitude for detection.

Figures 3, 4, 5:
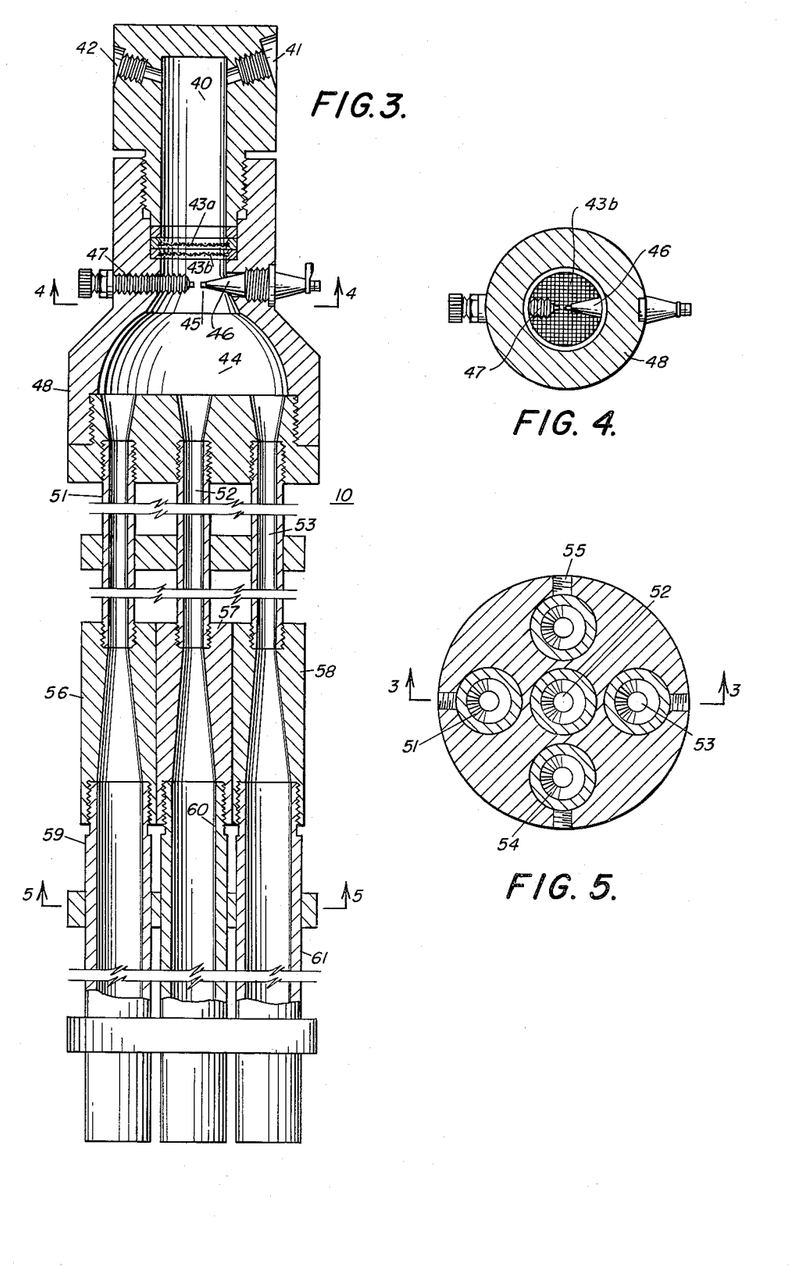
FIG. 3 is a cross-sectional view of a detonation system.
FIG. 4 is a sectional view taken along the lines 4—4 of FIG. 3.
FIG. 5 is a sectional view taken along the lines 5—5 of FIG. 3.

Referring now to FIGS. 3–5, there will be described a preferred embodiment of the invention though it is to be understood that acoustic generators of widely differing type may be constructed once the principles underlying the invention are comprehended.

In FIG. 3 the acoustic generator includes a mixing chamber 40 into which a combustible fluid enters by way of a passage 41 and in which it is mixed with an oxygen-containing fluid entering by way of a second passage 42. While air can be utilized to supply oxygen, other fluids can be utilized as will hereinafter be shown. The combustible fluid material within the mixing chamber 40 under the pressure of the fluids within the supply lines 41 and 42 flows downwardly through a flame barrier illustrated in the form of screens 43a and 43b and into an ignition chamber 44.

An igniter is located within the ignition chamber 44, preferably near the upper portion thereof. It comprises a spark gap 45 formed by two electrodes 46 and 47 one of which, the electrode 47, is adjustable relative to the other electrode 46, the latter being insulated from the housing 48. Extending from the ignition chamber 44 are a plurality of elongated hollow members or tubes 51—55 shown in the sectional view of FIG. 5 and with only tubes 51—53 appearing in FIG. 3. The detonation tubes 51—55 may extend the full length of the generator 10, though in the form illustrated, they include coupling elements, one for each tube such as the elements 56, 57 and 58, FIG. 3. These coupling elements are provided with tapered bores which increase in cross-sectional area from the adjoining ends of the detonating tubes 51—55 to their point of connection to the enlarged tubes three of which, the tubes 59, 60 and 61, appear in FIG. 3. Though not shown in FIG. 3, it may be desirable, as will hereinafter be described, further to increase the diameter of the system by use of additional couplings correspondingly larger than coupling members 56, 57 and 58 together with lengths of additional tubes whose cross-sectional areas are correspondingly larger.

Assuming now that the combustible mixture from chamber 40 has filled the internal flow passages, a high voltage will be applied across the electrodes 46 and 47 to produce a spark discharge across the gap 45. Peak voltages of the order of 28,000 volts have been found satisfactory though this high level is not critical. Upon the production of a spark, ignition of the combustible material proceeds in both directions from the gap 45. Due to small openings in screens 43a, 43b, combustion cannot proceed beyond the screens. However, in the other direction it has been found that ignition of the combustible material is dependent upon velocity of the mixture in the region of spark gap 45. For this reason the diameter of the ignition chamber 44 is enlarged relative to chamber 40 so that the velocity of the gas mixture is below a critical value above which ignition will not occur. Once ignition has been established it proceeds rapidly into the detonation tubes 51—55.

As the phenomenon is visualized, a flame is developed within each detonation tube normal to the axis of each tube. This flame or flame front moves rapidly down the tube and at an increasing speed exceeding that of sound in the combustible fluid, and as it does so the character of the oxidation of the gas changes from combustion to a phenomenon characterized as a "detonation." When the speed of the flame front attains a substantially constant value, detonation has occurred and the flame front proceeds at a high uniform speed through the detonation tubes 51—53, the coupling members, the enlarged tubes 59—61 and any succeeding larger stages.

Broadly, the present invention comprehends arrangements in which the flame within the detonation tubes increases in speed until it attains a high constant value whether above or below the speed of sound. In the embodiment being described and with a mixture of propane and air in stoichiometric amounts, the velocity of the flame front increases until it attains a substantially constant velocity in the range of about 3,000–5,000 feet per second which may be contrasted with the speed of sound in such a mixture of the order of 1,100 feet per second. Further in accordance with the invention, the detonation tubes 51—55 have a length to diameter ratio upwardly of about 40 and ranging as high as 80. The detonation tubes have cross-sectional areas which are well above that which will produce quenching of the flame as occurs at screens 43a, 43b. In one embodiment where a mixture of air and propane was used, the detonation tubes were 6 feet long and of a diameter of about ⅜ of an inch, the quenching diameter (or screen opening) of about .02 of an inch was safely exceeded. The flame front proceeds through the coupling members 56—58 which gradually increase in area to that of the tubes 59—61. Tubes 59—61 in one embodiment were also relatively long, of the order of 5 feet. They serve to stabilize the flame front after travel from small diameter tubes 51—53 to tubes 59—61 and preparatory to a further increase in the flame front in succeeding stages.

Having described one embodiment of the invention, some of the factors affecting operation and the design of the system will now be discussed. In operations involving delineation of bedding in water-covered areas other than the boundary between the water and sediments, it will be desirable to employ relatively low frequencies wherein wave lengths will be relatively long and attenuation relatively low. In general the predominant frequency of pulse output from the source shown in FIGS. 1 and 3 will be controlled to a large extent by the duration of the wave front upon emission from the outlet end of the enlarged tube system. For example, if the duration is of the order of $\frac{1}{200}$ of a second, the predominant frequency theoretically will be of the order of 100 cycles per second. Thus in general, if the flame front travels at a higher velocity through the tube, the duration at the outlet end will be shorter and consequently the frequency will be higher. Additionally, gradual enlargement of the tube diameter will result in a decreased flame velocity and will lower the frequency characteristic of the output pulse.

Figures 6, 7, 9:
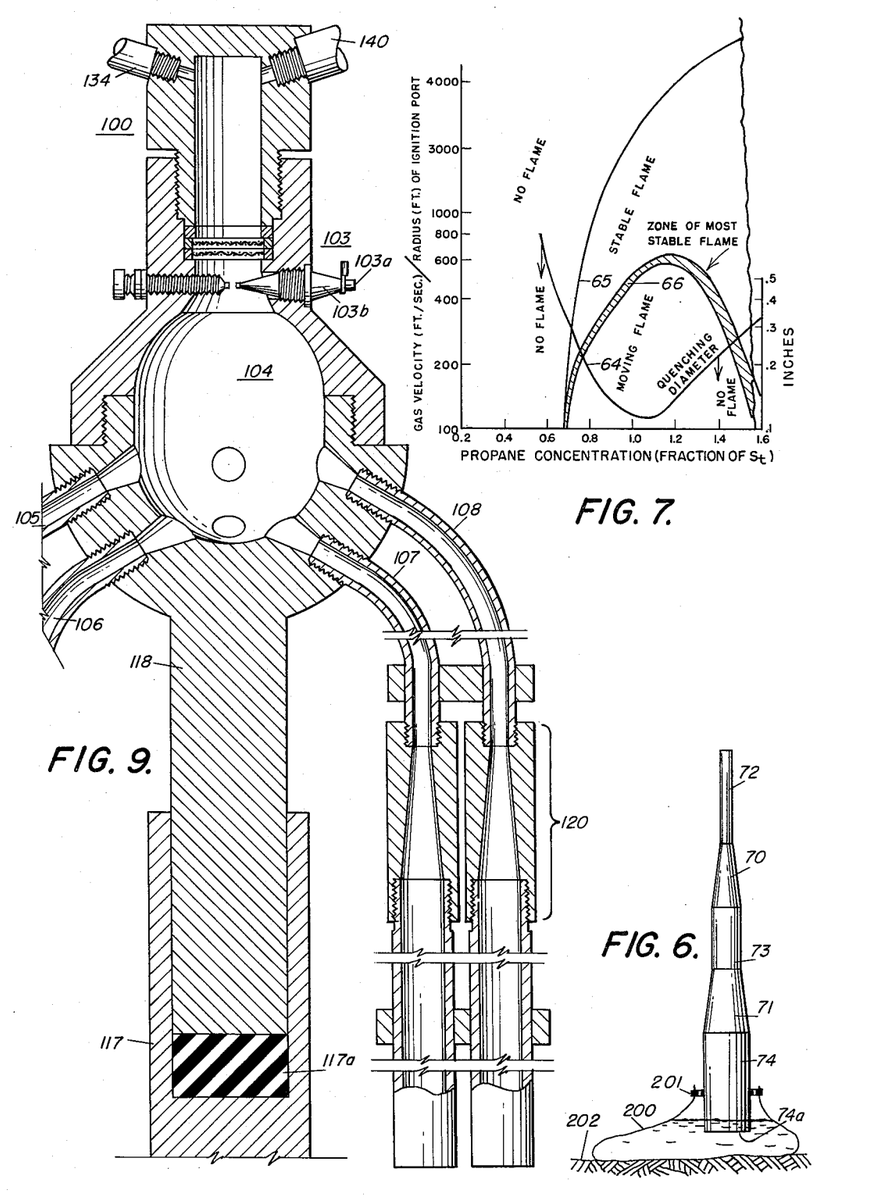
FIG. 6 is a modified form of an acoustic source.
FIG. 7 is a graph showing suitable combustion mixtures.
FIG. 9 is a sectional view of the upper end of the detonator of FIG. 8.

The use of couplings 59—61, FIG. 3, for the purpose of enlarging the tube is primarily to provide a larger area onto which the slug of compressed gas accompanying the flame front impinges. By increasing the area, the amount of energy transmitted into the medium may be increased and frequencies are somewhat lowered. Since the length to diameter ratio of the order of 40 to 80 is desirable in order to establish a detonation in the tube, it is preferable to employ tubes at the igniter of relatively small diameter and correspondingly small length in combination with suitable couplings to expand the diameter to the large areas desired for the requisite power levels and frequency content. However, it should be noted that the changes in cross-sectional area should be gradual in order to avoid disrupting the flame front. As shown in FIG. 6, tapered sections 70 and 71 are employed which are relatively long compared to the change in diameter in the coupled tubes 72—74. The rate of increase in cross-sectional area should be such that the flame front will continuously occupy the full cross-sectional area of the tube and that changes in hte flame front which will render it non-planar will be avoided. The flame front may be slightly convex in the direction of travel. However, substantial changes will cause the flame front to be reduced from a detonation to a mere burning of the gases, thus destroying its effectiveness as a gas propellant. The foregoing description of the phenomena taking place inside of the tubes has been confirmed in practice at least in terms of end results. Theories have been evolved as above stated which are believed to be accurate at least qualitatively. However, because of the numerous factors involved it will be understood that the theories above stated are to be taken as helpful in gaining an understanding of the invention but without restricting the scope thereof.

In some applications it may be feasible to employ tubes which throughout the length thereof are of the same diameter as tubes 51—55. More of them can occupy the same space and thus such an acoustic generator can have generally the same output as the one illustrated in FIG. 3. This follows from the fact that the total amount of combustible material in the two designs will be approximately the same. In addition to lowering the frequency of the pulse, as by increasing the duration of the wave front upon emission from the enlarged tubes, the device as a whole is considerably shortened by utilizing the connecting members 56—58 with their gradually increasing tapered bores. In general, a taper of about 15° has been found to be satisfactory for the bore of the coupling members, though it is to be understood that this is not critical and that the taper can vary below 15° as desired and can be increased above 15° by considerable amounts which will in part depend upon the oxygen content of the combustible material.

In the modification of FIG. 3, the structure has been illustrated as fairly rugged in character, and this has been done for mechanical stability of an acoustic generator which was of the order of 18 feet in length. It should be noted that the construction was not designed to absorb reactive forces since the generator functions with the minimum, a substantial absence, of recoil.

As to the combustible mixture utilized, it must be such as can be ignited in combustion chamber 44. The oxygen content can be controlled either by selection of the initial material or by addition of oxygen in the form of compressed air or with air enriched with oxygen or other oxygen-bearing materials. The reference to propane, accordingly, is suggestive of one fluid which has been found suitable with compressed air as the oxygen-supplying material. A wide variety of fluid material may be substituted for propane including petroleum fractions both of higher and of lower molecular weights. Hydrogen alone can be used and in general any fluid which can be mixed in the mixing chamber 40 and passed through a flame barrier into the combustion chamber 44. Atomized liquids may meet the foregoing requirements and illustrate the wide variety of fuels which can be used for the operation of the acoustic generator. It is, of course, to be understood that a particular fluid will be selected in terms of the cost and safety and convenience in use. For any particular fuel, there are a number of considerations which suggest the requirements in terms of oxygen present in the mixture. These include the desired flow rate through the tubes. The flow rate will be selected so that after the production of a pulse the tubes conveniently may be recharged with a combustible medium just prior to the time ignition is to occur for the production of the next pulse. Thus there will be more or less continuous flow of the combustible mixture into and through the tubes. Continuous flow of the combustible mixture under pressure will prevent ingress of water which envelopes the ends of the tubes as to provide an efficient coupling to the formations to be surveyed. If the gas flow rate is necessarily high in order to produce pulses at a fairly high repetition rate, the oxygen content will be increased in order to assure ignition of the rapidly moving combustible mixture in the ignition chamber. If at the time of design the high repetition rate is taken into account, the ignition chamber 44 can be made larger in the region in which the spark gap 45 is located in order to assure ignition with a lower oxygen content.

There are further considerations in respect to the oxygen content of the combustible mixture. In terms of the velocity of the flame front, a maximum value appears in the region just above a stoichiometric mixture of oxygen in respect to the combustible components of the gas. A stoichiometric mixture has already been indicated as satisfactory for the operation of the generator 10, and there are fairly wide limits permissible in the mixture. There is to be avoided a mixture of oxygen in respect to the combustible components resulting in stable flame conditions in the sense that the flame front will remain fixed.

In FIG. 7 there is presented data involving the dimensions of the detonation tube and suitable mixtures of propane and air. The abscissae are plotted as the ratio of propane to air in terms of proportions of stoichiometric amounts. The left hand ordinates are plotted in terms of the ratio of gas velocity at the point of ignition to the radius of port 104 of the loctaion of the spark gap, FIG. 9. The right hand ordinates are plotted in terms of the quenching diameter in inches.

(1) Line 64 defines a boundary in terms of diameter below which combustion may not be initiated and above which the possibility of a combustion and detonation is present; (2) line 65 defines a boundary in terms of proportions of the gas mixture and ratio of flow velocity to diameter. To the left of line 65 there can be no flame or combustion and to the right of line 65 combustion may be initiated; (3) a cross-hatched zone 66, lying entirely to the right of line 65, represents a zone of stable flame or combustion; and (4) the zone intermediate the cross-hatched area 66 and the line 64 represents mixtures suitable for the production of a detonation.

Operations in the latter zone, i.e., of moving flame or combustion, are satisfactory for carrying out the present invention. Upon ignition of such a mixture combustion proceeds in both directions. Considering the structure of FIG. 3, combustion moving upwardly encounters the screens 43a, 43b and is extinguished. However, the combustion may proceed through the chamber 44 and the tubes 51—55 for the development of a detonation wave.

While FIG. 7 involves propane-air mixtures, other suitable mixtures employed involve hydrogen and air, acetylene and air, hydrogen and oxygen, acetylene and oxygen, etc. Such mixtures are disclosed and discussed in "Explosion and Combustion Process and Gases," by Wilhelm Yost, McGraw-Hill Book Company, Inc., New York, 1946, in the section at pages 160–210.

The graphs of FIG. 7 are primarily of aid in determining a design which will assure ignition of combustible mixtures of different ratios. Access to such a family of curves is not essential to the design of the apparatus since there has been demonstrated that successful operation can be achieved empirically by varying the oxygen content of the fuel in tubes of given diameter and length.

Figure 8:
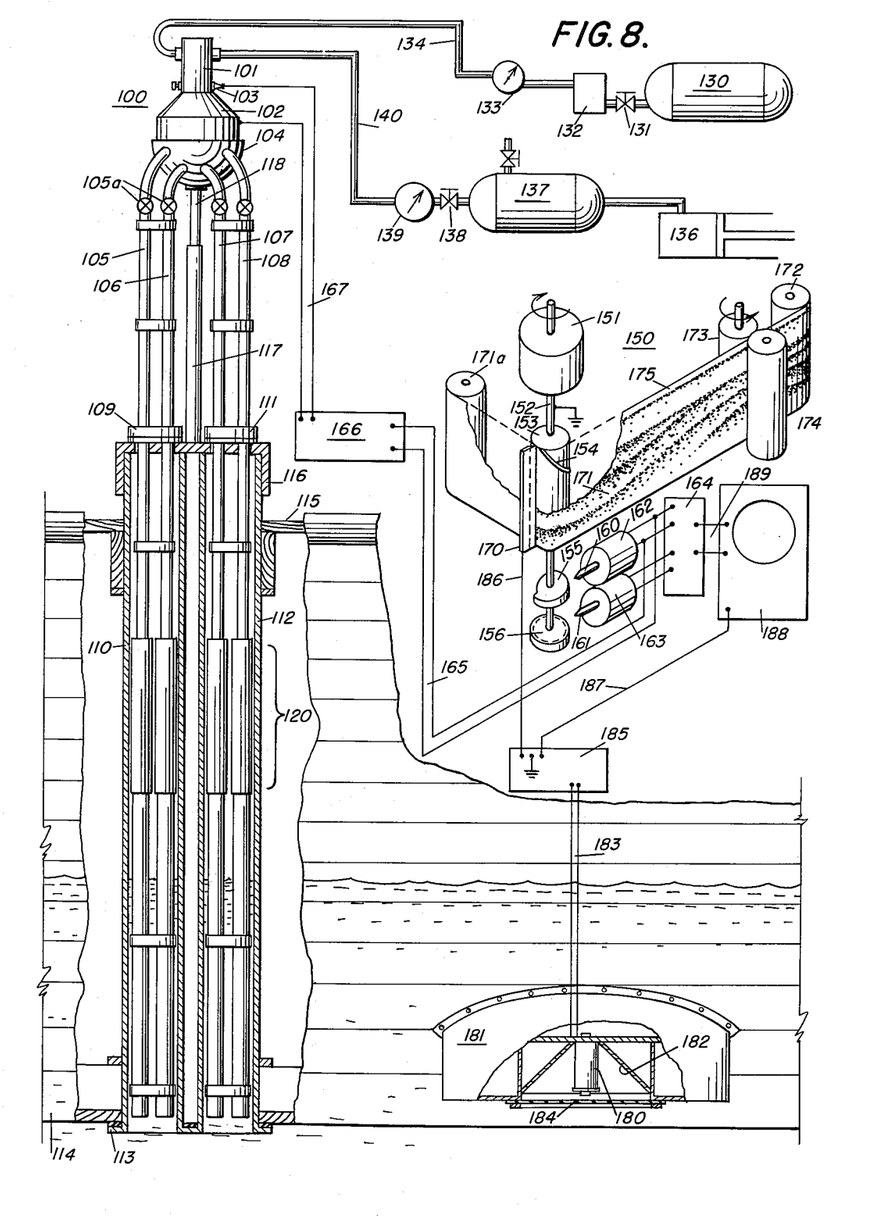
FIG. 8 is a representation of a surveying system mounted on a boat.

In FIG. 8 there is illustrated a system for employing a detonation type source 100 as a source of seismic waves in marine exploration. The source comprises a mixing chamber 101 and an ignition chamber 102 having the igniter 103 fitted therein. The ignition chamber 102 is provided with a spherical shaped bottom 104 from which there depends a plurality of tubes, four of which, the tubes 105, 106, 107 and 108, being shown. Tubes 105 and 106 are nested in a bracket 109 and extend through a pipe or chamber 110. Similarly, tubes 107 and 108 are nested or supported in a bracket 111 and extend through a second pipe or chamber 112. The chambers 110 and 112 may comprise steel or iron pipes fitted with a flange 113 and secured in a water-tight fashion to the hull of a boat 114. As shown in FIG. 8, the flange 113 is common to the tubes 110 and 112. The tubes 110 and 112 rise above the deck 115 of boat 114 and are provided with a cap 116 that is common to both tubes. The brackets 109 and 111 rest on and are supported by the cap 116. A tube 117 mounted on cap 116 extends upwardly as to receive a rod 118 which is inserted into the upper end of tube 117 and suitably cushioned as to provide the primary support for the detonator 100. While the tubes 105—108 may be provided with several conical-shaped sections to enlarge the diameter thereof, a single set of such sections has been illustrated in the zone 120. The tubes 105—108 of relatively small diameter adjacent the ignition chamber 104 are of much larger diameter at the bottom of the boat 114. As illustrated, the tubes 110 and 112 are hollow and open at the bottom, permitting the water to rise to the same level inside the tubes 110 and 112 as the draft of the boat. The water may also rise inside the tubes 105—108.

Combustible gas is supplied to the detonator 100 from a storage tank 130 which is connected by way of a valve 131, a pressure regulator 132, a flow indicating device 133 and conduit 134 to the upper end of the mixing chamber 101. Compressed air is provided by a compressor 136 coupled to a storage tank 137. Tank 137 is connected by way of a valve 138, a flow indicating device 139 and conduit 140 to the upper end of the mixing chamber 101. In practice, valves 138 and 131 will be opened as to provide the proper mixture of propane and air in the mixing chamber 101. A continuous gas flow will then be provided which will travel downwardly through the tubes 105—108 forcing the water level downward so that the gas will continuously bubble out of the bottom of the tubes 105—108. The escaping gas preferably will be caused to flow out of the tubes 110 and 112. It is desirable in the interest of safety that a gas-tight seal between the brackets 109 and 111 and the cap 116 be provided.

The gas mixture thus placed in tubes 105—108 is periodically ignited for the production of a detonation wave by means of the control and recording system 150. More particularly, a motor 151 drives a shaft 152 on which there is mounted a drum 153 carrying a peripheral metallic spiral 154. A pair of cams 155 and 156 is also mounted on shaft 152 and rotated in synchronism with the spiral 154.

The motor speed preferably is in the order of about 1 or 2 revolutions per second or less. A pair of permanent magnets 160 and 161 is provided with the ends thereof adjacent cams 155 and 156, respectively. The coils 162 and 163 are wound around magnets 160 and 161, respectively. Once every revolution of cam 155 there is produced in the coil 162 a voltage pulse by reason of the variation in flux due to magnet 160. The latter pulse is applied to a control circuit 164 and by way of conductors 165 whose output is applied to a voltage pulser 166. When the voltage from coil 162 is applied to pulser 166, there is produced in circuit 167 a sharp high voltage pulse which is applied to the igniter 103 to produce a spark in the ignition chamber 102. The cam 155 is so adjusted on shaft 152 that such a spark is produced in predetermined time relation with respect to the instant that the upper end of spiral 154 is in registry with a knife edge of a recording electrode 170. Electrode 170 extends parallel to shaft 152 and is spaced as to be substantially in contact with the spiral 155. A strip of electrosensitive recording paper 171 from a storage drum 171a is fed over drum 153 and onto a take up roll 172. The recording paper is driven by driving rolls 173 and 174 at a rate which has a known or otherwise predetermined relation with respect to the speed of boat 114 along a given course. Thus the shaded line 175 near the upper edge of the recording paper 171 may be representative in time of the instant of generation of a detonation wave. The detonation wave traveling downwardly through the tube produces simultaneous impacts on the water at the mouth of the tubes. A shock wave is thus imparted to the water which travels downwardly into earth formations. Acoustic energy reflected from interfaces below the boat is detected by a suitable transducer, in one form a crystal 180 mounted in a housing 181 fastened to the hull of the boat near the bottom thereof. The detector crystal 180 is mounted in a conical-shaped cavity 182 so that sound waves impinging the conical-shaped walls will be reflected to the crystal to produce on circuit 183 an electrical signal which is representative in time of the pressure pulses in the water. A resilient membrane 184 is mounted over the face of the detector 181 to eliminate flow developed noises that might otherwise interfere with the desired measurements.

Circuit 183 is connected to an amplifying circuit 185 which treats the signal from crystal 180 in a manner appropriate first to be applied by way of conductor 186 to the knife edge electrode 170. The signal is also applied by way of a channel 187 to an oscilloscope 188 whereon the signal may be viewed. The sweep of the oscilloscope may be triggered in response to signals from the coil 162 as applied by circuit 189. Suitable timing markers may be applied to the oscilloscope 188 from coil 163. The dotted line on cam 156 represents gears or a toothed periphery which upon rotation past magnet 161 will produce voltage pulses which will conveniently scale the time interval required for each revolution of shaft 152 thus producing the aforesaid timing markers.

On the recording chart 171 the distance below the line 175 is representative of time required for a given pulse from the detonator 100 to travel to a reflecting interface and back to the detector 180. The latter times in general are proportional to depth of the interface and provide a graphic picture, by reason of the reflections from successivly deeper beds, of the attitude and structure of the formations underlying water-covered areas.

The speed at which motor 151 rotates will control the depth to which the exploration may extend. If rotated at 20 cycles per second, the maximum travel times that could be recorded on record 171a would be 50 milliseconds which would limit the exploration to relatively shallow depths. At a rotational speed of 1 cycle per second, reflections of depths of a thousand or more feet below the unit may be recorded.

For exploring depth beyond the first few hundred feet of section by the present method it would be desirable to produce pulses of high energy and relatively low frequency content. For this purpose the detonator 100 is admirably suited. While four tubes, tubes 105–108, have been illustrated, in one embodiment of the invention twenty-eight such tubes were disposed in clusters of seven tubes each. Each cluster was mounted in and extended through a well or chamber such as the wells 110 and 112 shown in FIG. 8. Each detonation tube was provided with a valve such as the valve 105a in order to provide latitude in the number of tubes to be employed. For relatively shallow depths, one tube may be sufficient in which case all valves 105a except one would be closed and the gas flow rate suitably adjusted. Operation of the single detonation tube is a relatively sharp, high frequency, low energy pulse suitable for penetrating the upper section of the strata. By employing a great number of tubes with all valves 105a open and gas flow rate properly set, the resultant acoustic wave is distributed over a substantial area and includes lower frequencies so that greater penetration with higher energy pulses may be achieved.

Operation of the recording system will be controlled in dependence upon the depth of formations of interest and the detail desired. Keeping in mind that the velocity of acoustic waves through water is in the order of 5,000 feet per second and generally higher in sediments, any one of the three following general objectives may be accommodated.

First, a plot of all major reflection horizons within a long earth section may be obtained by generating pulses at a low rate of, for example, every two seconds. In the latter case spiral 154 would traverse the width of the recording paper or chart 171 in a two second interval. Any voltages applied to bar 170 as representative of reflections would be indicated on chart 171. Reflections from 5,000 feet or more below the source and detector could be recorded. Since the depth scale on chart 171 would be large, the detail possible on such a plot would be limited so that unit 185 would be so provided as to apply voltages to bar 170 representative of only the most prominent reflections.

Second, at the same pulse repetition rate as above discussed, motor 151 may be driven at a faster speed to decrease the time scale on chart 171. By selectively gating amplifier 185, as well understood by those skilled in the art, a highly amplified or detailed plot of the lithology of a limited earth section may be obtained. If the speed of motor 151 is 20 cycles per second, then the time section on chart 171 would correspond with 50 milliseconds of travel through the earth or 150 feet of section wherein the acoustic velocity is 6,000 feet per second. Pulser 166 would then be actuated every twentieth revolution of cam 155 as by suitable gating means at the input of unit 166.

Third, the same detailed plot of the near surface earth section may be obtained by actuating driving motor 151 at a high speed and generating an acoustic pulse on each revolution thereof.

In the foregoing operations, high energy, low frequency pulses would be employed for greater depths whereas shallower depths could be explored using a single one of the tubes forming a part of source 100, FIG. 8.

In FIG. 9 the detonator 100 has been illustrated in a fragmentary sectional view in which the igniter chamber 104 is of generally cylindrical shape. Tubes 105—108 attached to the cylindrical lower portion. The ignitor 103 formed of a metallic pin 103a extends through an insulating bushing 103b which is threaded onto the upper wall of the chamber 104. Otherwise the detonator is similar to that above described in connection with FIG. 3. However, in the multi-tube system the flow of gases from conduits 134 and 140 through igniter chamber 104 then proceeds through the tubes 105—108 which are curved at the connections to the chamber 104. The absence of recoil in the system permits the simple construction illustrated in FIGS. 8 and 9, it being required to provide suitable flow channels of a proper dimensional relationship.

The structure forming chamber 104 is provided with a depending pedestal 118 which is received by the tubular support 117, the latter being supported from the boat deck. A rubber cushion 117a is provided in support 117 at the lower end of the pedestal 118 to reduce vibration and otherwise provide a resilient base for the detonator 100.

While the system above described is most readily used in marine exploration where it may be mounted on a water-borne craft and moved over a traverse with coupling continuously maintianed to the body of water, it will be appreciated that generally similar operations may be carried out on land. As illustrated in FIG. 1, a depression in the earth filled with water provides a coupling whereby sound energy may with relatively high efficiency be transmitted to the earth formations. Such coupling has two distinct advantages over the use of the system wherein the compressed gases impinge the earth's surface without the intermediate fluid coupling. The first is that the energy imparted to the earth is higher than otherwise. The second is that the air waves constituting unwanted noise are reduced proportionately so that the resultant signal to noise ratio at any adjacent detecting system will be high enough to identify reflections. However, it may be found desirable to utilize the system without intermediate fluid coupling in which case the muzzle of the detonator tube, placed adjacent the earth's surface, will produce a percussive impact on the earth's surface. It will be seen that a preferred orientation of the source is one in which the detonation path is in substantial alignment with the path along which propagation of compressional wave energy is desired. The open end of the source will be intimately associated with the adjacent surface.

It may be desirable to provide the system with a flexible container filled with a suitable fluid. In one form such a provision is illustrated in FIG. 6 wherein a resilient bag 200 secured by a band 201 to the lower end of the enlarged tube 74 is filled with a fluid which, when the lower end 74a of the lower section 74, is positioned a predetermined distance from the surface 202 of the earth, the fluid extends up into the muzzle of the detonator tube. Thus a medium of intermediate density is provided to couple the sound to the formations beneath surface 202. If repetitive pulses are to be generated, suitable means are provided for venting detonation gases from the system as through holes in the mounting ring or band 201.

In FIG. 8 the receiving system comprises a single crystal mounted in a detecting unit on the hull of the boat. In FIG. 2 the detecting means comprises a plurality of cable drawn units 30a—30n. In some instances it may be desirable to use the latter type detecting system particularly where the sensitivities of the detectors are adjusted to have predetermined pattern, for example, end detectors provided with a lower sensitivity than the center detectors in order to discriminate against horizontally propagated sound waves and selectively to emphasize the vertically traveling waves reflected from subsurface beds. Spreads of the latter type perform functions similar to the more commonly known time domain filters to give directional selectivity. The detector system of FIG. 2 in any event preferably will be of streamlined character to avoid undue road noise.

While the invention has been described in connection with certain specific embodiments thereof, it will now be understood that further modifications will suggest themselves to those skilled in the art and it is intended to cover such modifications as fall within the scope of the appended claims.

What is claimed is:

1. A continuous seismic exploring system which comprises a carrier for traversing the surface of the body to be explored, means on said carrier for continuously flowing a combustible gas mixture along a vertical path intersecting the surface of said body, means for periodically establishing in the upper portion of said path a downwardly traveling detonation wave for generating seismic waves in said body, detecting means movable with said carrier and coupled to said body for producing electrical signals representative of seismic waves reflected from subsurface horizons to said surface, a record element, means including translating and registering means connected to said detecting means for producing an output dependent upon the magnitude of said electrical signals, means for adjusting the position of said registering means along a first dimension of said record element in proportion to the time interval between initiation of each said detonation wave and the arrival of resultant reflections at said detecting means, and means for varying the position of said registering means along the second dimension of said record element in proportion to the movement of said carrier along said surface for registering said output at a situs on said record element dependent upon the position of said carrier and the travel time of a given reflection.

2. A continuous marine seismic exploring system which comprises a craft for traversing a course over a water-covered area to be explored, means carried by said craft for continuously flowing a combustible gas mixture along a vertical path which extends below the water surface, means for periodically establishing in the upper portion of said path a downwardly traveling detonation wave for establishing seismic waves below said surface, detecting means movable with said craft positioned below said surface for producing electrical signals representative of seismic waves reflected from subsurface horizons to said surface, a record element, means including translating and registering means connected to said detecting means for producing an output having instantaneous magnitudes dependent upon the magnitude of said electrical signals, means for adjusting the position of said registering means along a first dimension of said record element in proportion to the time interval between initiation of each said detonation wave and the arrival of resultant reflections at said detecting means, and means for adjusting the position of said registering means along the second dimension of said record element in proportion to the movement of said craft for registering said output at a situs on said record element dependent upon the position of said craft on said course and the travel time of a given reflection.

3. In seismic exploration, of water-covered areas the method which comprises continuously flowing a mixture of a combustible gas and an oxidizing component along an elongated confined zone extending downward below the surface of the water, concomitantly moving the point of entry of said gas into said water at a uniform speed along a predetermined course in said water, periodically initiating downwardly traveling detonation waves in the upper region of said zone to produce repetitive impacts upon said water, detecting seismic waves resulting from said detonation waves, and recording said seismic waves at points along a space scale whose abscissae are in terms of the location of said point of entry along said course and whose ordinates are in terms of time elapsing with respect to the instant of said impacts and with scalar representations along each said ordinate representative of variations in intensity of said seismic waves whereby continuous representation of subsurface beds is obtained.

4. A source of seismic waves for use on a craft in water-covered areas comprising the combination of a plurality of slim elongated tubes supported by said craft for movement along a course over one of said areas and extending to a plane below the surface of the water, a source of combustible gas, means for introducing said gas to the top of said tubes at a substantially uniform flow rate for flow thereof downwardly through said tubes into the water, and means for periodically initiating combustion of said gas adjacent the top of each of said tubes for producing downwardly traveling detonation waves therein whereby impact of said waves on the water at the mouth of said tubes produces seismic energy pulses.

5. A source of seismic waves for use in a water-covered area comprising the combination of a plurality of slim elongated tubes each having an open end substantially in a common plane parallel to and below the surface of the water, a chamber connected to the top of all of said tubes, means for introducing a combustible gas mixture into said chamber for substantially uniform gas flow downward through said tubes to said plane, means for periodically initiating combustion of said mixture at a point in said chamber for producing detonation waves traveling downwardly through said tubes to impact the water at said plane to produce seismic energy pulses, and means for extinguishing combustion traveling from the initiating point in the counter-flow direction.

6. The combination set forth in claim 5 in which the last named means comprises a transverse screen forming a barrier which with respect to said gas mixture will prevent combustion to pass therethrough.

7. A source of seismic waves for use on a craft in a water-covered area comprising the combination of means for forming a well extending from the deck through the bottom of said craft, a plurality of elongated tubes extending in said well to a point below the water line on said craft, a source of combustible gas, means for introducing said gas to the top of said tubes at a substantially uniform flow rate for flow thereof downwardly through said tubes and to a point beneath said craft, and means for periodically initiating combustion of said gas at a point adjacent the top thereof for producing detonation waves whereby impact of said waves on the water at the mouth of said tubes produces seismic energy pulses.

8. The method of continuously exploring a marine area which comprises flowing a combustible gas mixture along a vertical path extending into a water body at uniform flow rate, periodically establishing in the upper portion of said path a downwardly traveling detonation wave for establishing seismic waves in said water body, generating a signal having a predetermined time relation with the impact of said wave upon said water body, generating electrical signals representative of the reflection of said waves from subsurface boundaries, and recording said waves at a situs in a recording zone having abscissae proportional to movement of the point of impact along the surface of said water body and as ordinates the time interval between each said signal and the generation of said electrical signals which result from each said impact.

9. In seismic exploration of water-covered areas the method which comprises flowing at a controlled rate a mixture of a combustible gas and an oxidizing component along an elongated confined zone extending downward below the surface of the water, concomitantly moving the point of entry of said gas into said water at a uniform speed along a predetermined course in said water, periodically initiating downwardly traveling detonation waves in the upper region of said zone to produce repetitive impacts upon said water, detecting seismic waves resulting from said detonation waves, and recording said seismic waves at points along a space scale whose abscissae are in terms of the location of said point of entry along said course and whose ordinates are in terms of time elapsing with respect to the instant of said impacts and with scalar representations along said said ordinate representative of variations in intensity of said seismic waves whereby continuous representation of subsurface beds is obtained.

10. In seismic exploration of water-covered areas the method which comprises flowing at a controlled rate a mixture of a combustible gas and an oxidizing component along an elognated confined zone extending downward below the surface of the water, concomitantly moving the point of entry of said gas into said water at a predetermined speed along a predetermined course in said water, at predetermined intervals initiating downwardly traveling waves of increasing speed in the upper region of said zone to produce repetitive impacts upon said water, detecting seismic waves resulting from said waves of increasing speed, and recording said seismic waves at points along a space scale whose abscissae are in terms of the location of said point of entry along said course and whose ordinates are in terms of time elapsing with respect to the instant of said impacts and with scaler representations along each said ordinate representative of variations in intensity of said seismic waves whereby a representation of subsurface beds along said predetermined course is obtained.

11. A system for seismically exploring a water-covered area which comprises structure forming an elongated combustion chamber having an open end extending to a point below the surface of the water, means for repeatedly loading said chamber with a combustible gas mixture, a carrier supporting said structure including said chamber for movement of the point of entry thereof into the water along a predetermined course, means including an igniter in the upper portion of said structure and communicating with said chamber, means for periodically exciting said igniter for initiating in the upper portion of said chamber of said structure a downward traveling wave of increasing speed in said mixture upon combustion of each of said mixtures whereby a downward traveling wave strikes the surface of the water at spaced points along said course, a detecting system moved with said carrier and responsive to seismic waves produced by each impact of said downward traveling wave for generating signals representative of said seismic waves, and means for recording said signals successively in side-by-side location representative of the spacing between said points along said course for the production of a visual representation of subsurface beds.

12. A seismic wave source suited for use in a water-covered area comprising means including at least one slim elongated tube terminating at its lower end in an opening of enlarged cross-sectional area substantially in a plane parallel to and below the surface of the water, structure forming a chamber connected to the top end of said tube, means connecting with said structure for introducing a combustible gas mixture into said chamber to produce a controlled gas flow downward through said tube to said plane, igniter means in communication with said structure for periodically igniting a portion of said combustible mixture at a point closely adjacent the end of said chamber at said top end of said tube to initiate production of a wave of increasing speed which travels downwardly through said tube to impact the water at said plane to produce a seismic energy pulse traveling in the direction of said wave, and means supported by said structure upstream from said igniter means for extinguishing combustion traveling from the ignition point in the counter-flow direction.

References Cited in the file of this patent

UNITED STATES PATENTS

| 1,500,243 | Hammond | July 8, 1924 |
| 2,353,484 | Merten et al. | July 11, 1944 |
| 2,480,626 | Bodine | Aug. 30, 1949 |
| 2,539,220 | Athy et al. | Jan. 23, 1951 |
| 2,633,703 | Tenney et al. | Apr. 7, 1953 |
| 2,766,837 | McCollum | Oct. 16, 1956 |
| 2,772,746 | Merten | Dec. 4, 1956 |
| 2,866,512 | Padberg | Dec. 30, 1958 |

OTHER REFERENCES

Publication: San Diego Union "Navy Announces New Ocean Bottom Mining," Apr. 12, 1953, pages 2–23.

UNITED STATES PATENT OFFICE
CERTIFICATE OF CORRECTION

Patent No. 2,994,397                                            August 1, 1961

William B. Huckabay

It is hereby certified that error appears in the above numbered patent requiring correction and that the said Letters Patent should read as corrected below.

Column 5, line 47, for "hte" read -- the --; column 6, line 18, for "materials" read -- material --; column 9, line 19, for "depth" read -- depths --; column 10, line 10, after "105-108" insert -- are --; line 34, for "maintianed" read -- maintained --; column 11, line 69, strike out the comma; column 13, line 2, for "predtermined" read -- predetermined --; line 11, for "said", first occurrence, read -- each --; line 17, for "elognated" read -- elongated --; column 14, line 46, for "pages 2-23" read -- a-23 --.

Signed and sealed this 6th day of February 1962.

(SEAL)
Attest:

ERNEST W. SWIDER                                    DAVID L. LADD
Attesting Officer                                  Commissioner of Patents